United States Patent Office 3,829,417
Patented Aug. 13, 1974

3,829,417
IMIDAZOLE SUBSTITUTED RIFAMYCINS
Nicola Maggi, Milan, and Renato Cricchio, Varese, Italy, assignors to Gruppo Lepetit S.p.A., Milan, Italy
No Drawing. Filed Dec. 29, 1972, Ser. No. 319,657
Int. Cl. C07d 99/02, 99/04
U.S. Cl. 260—239.3 P         13 Claims

ABSTRACT OF THE DISCLOSURE

Disclosed are 3-substituted rifamycins of Formula I and their 25-desacetyl and 16,17; 18,19; and 28,29 hexahydro derivatives

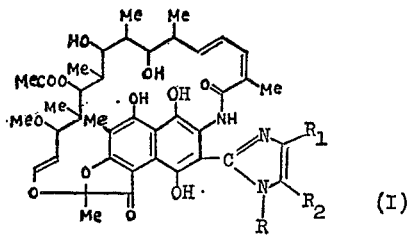

wherein R represents hydrogen, lower alkyl, phenyl and phenyl-lower alkyl, $R_1$ and $R_2$ together represent a carbocyclic chain forming with the double bond of the adjacent imidazole moiety a benzene ring, a mono or poly-substituted benzene ring wherein the substituents are independently selected from lower alkyl, lower alkoxy, halo, carboxy, carbalkoxy, sulfo, sulfamoyl, nitro, trifluoromethyl, carbamyl, mono and di-lower alkyl-carbamyl and methylenedioxy, or a substituted or unsubstituted fused polynuclear aromatic group including 2–3 condensed rings each of 5–6 carbon atoms.

The compounds of the invention are useful as antibacterial agents.

GENERAL SUMMARY

The present invention relates to rifamycin compounds and is more particularly concerned with 3-substituted rifamycins of Formula I and their 25-desacetyl and 16,17; 18,19; and 28,29 hexahydro derivatives

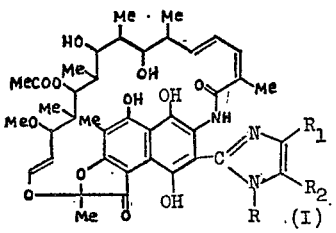

wherein R represents hydrogen, lower alkyl, phenyl and phenyl-lower alkyl, $R_1$ and $R_2$ together represent a carbocyclic chain forming with the double bond of the adjacent imidazole moiety a benzene ring, a mono or poly-substituted benzene ring wherein the substituents are independently selected from lower alkyl, lower alkoxy, halo, carboxy, carbalkoxy, sulfo, sulfamoyl, nitro, trifluoromethyl, carbamyl, mono and di-lower alkyl-carbamyl and methylenedioxy, or a substituted or unsubstituted fused polynuclear aromatic group including 2–3 condensed rings each of 5–6 carbon atoms.

As used in this disclosure the term "lower alkyl" and "lower alkoxy" are ordinarily represented by straight or branched aliphatic chains of from 1 to about 6 carbon atoms. In the rifamycin compounds of formula I where according to the definition above, $R_1$ and $R_2$ together represent carbocyclic chains forming a "fused polynuclear aromatic group," the substituent in position 3 is ordinarily represented by an imidazole ring condensed with a naphthalene, acenaphthene, fluorene, anthracene or phenanthrene moiety. These aromatic moieties may also contain substituent groups such as oxo, hydroxy and sulfo.

The novel compounds are prepared by reaction of 3-formylrifamycin SV or its 25-desacetyl or hexahydro derivative with an aromatic ortho-diamine of the formula

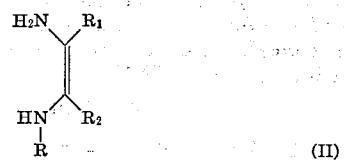

wherein R, $R_1$ and $R_2$ have the same meaning as above. The obtained Schiff's base (III) or its isomeric imidazoline form is then ordinarily oxidized to an imidazole derivative according to the following scheme which illustrates the case where as the starting material 3-formylrifamycin SV is utilized. If the rifamycin moiety has been transformed in the quinone form during the oxidative step, washing with ascorbic acid solution or other equivalent reagents reduces the quinone to the corresponding hydroquinone.

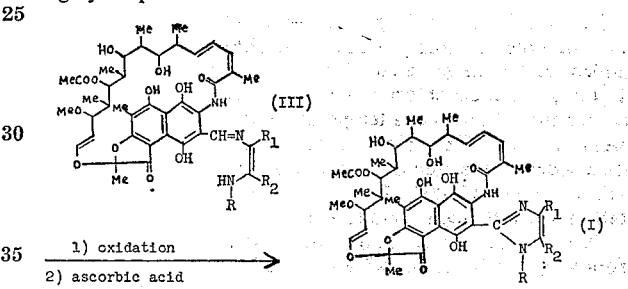

Air, cupric salts, mercuric oxide, manganese dioxide, isoamyl nitrite, potassium ferricyanide and lead tetraacetate are the most suitable oxidizing agents. In some instances the isolation of the Schiff's base or the corresponding isomeric imidazoline may not be necessary since by carrying out the reaction between the aromatic diamine and the 3-formylrifamycin SV derivative in the presence of air or other hydrogen acceptors the final imidazole compound may be directly recovered.

According to a preferred method for preparing the compounds of the invention, an equimolecular amount of a selected ortho-diamine of formula II is added at room temperature to a solution of 3-formylrifamycin SV or its 25-desacetyl or hexahydro derivative. The mixture is maintained at a temperature which may vary from the room temperature to the boiling point of the solvent until the reaction is completed, i.e. for a period of time ranging from 20 minutes to 3 hours, the desired product compound usually is recovered by removing the solvent. The preferred solvent generally is tetrahydrofuran but other organic solvents, such as for instance dioxane or lower alkanols, may be advantageously used. The crude product may be purified by crystallization or chromatography or, if the compound obtained is not in the imidazole form, it may be submitted as such to an oxidative step. The oxidation is preferably carried out in a mixture of acetic acid and a chlorinated lower hydrocarbon by using about one equimolecular amount of lead tetraacetate as the oxidizing agent. The reaction usually is carred out at a temperature ranging from about −5° to about 10° C. and the end product is recovered after about 1–3 hours. The solution is evaporated to dryness after having washed the organic layer with a 10% ascorbic acid aqueous solution to reduce the quinonic rifamycin form to its corresponding hydroquinone.

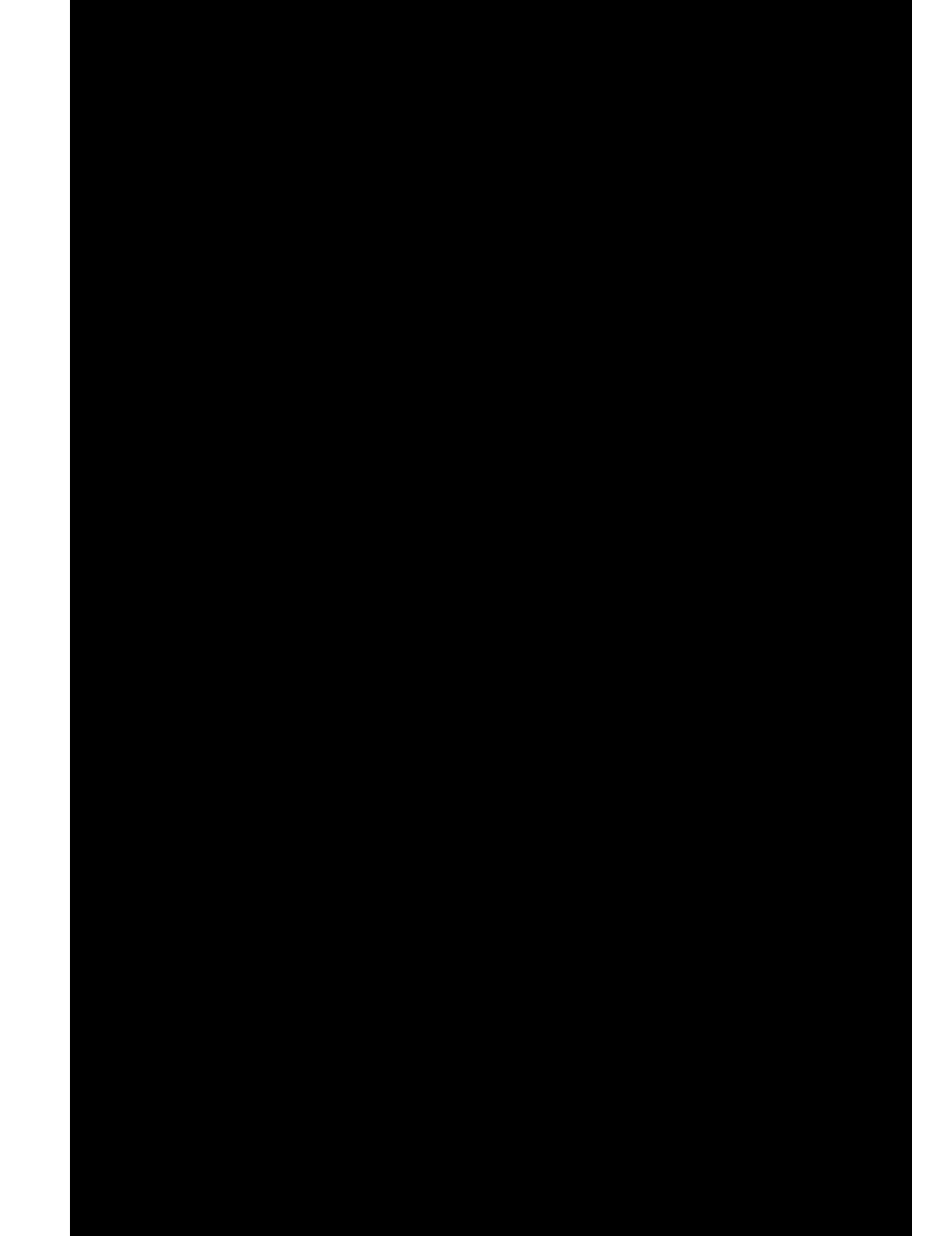

0.05 μg./ml. The activity was confirmed also in the presence of biological fluids such as bovine sera. Certain compounds of the invention also display a good inhibiting effect against *Staphylococcus aureus* strains resistant to rifampicin. In representative experiments in vitro with the compounds of Examples 4, 5, 6 and 8 the growth of a *Staphylococcus aureus* Tour strain, resistant to rifampicin, was inhibited by concentration ranging from 1 to 5 μg./ml. The toxicity of these compounds is very low; i.e., they are well tolerated by mammals.

Another very important feature of the invention compounds is their inhibiting activity of DNA polymerases which are characteristic of human leukemic blood lymphoblasts and against typical nucleotidyl transferases (polymerases) of virus not utilized by the normal cell. It is known from studies on representative members of virus groups that they either carry or induce into the host cells polymerases as an essential part of their replication. Thus, there are viruses such as picornaviruses or polioviruses which induce RNA-dependent RNA-polymerase while other groups such as leukemia-sarcoma viruses carry a RNA-dependent DNA-polymerase. The presence and the very important role of the RNA-dependent DNA-polymerase (reverse transcriptase) in oncogenic RNA viruses has been discovered by D. Baltimore, Nature, *226*, 1209 (1970), and by H. M. Temin et al., Nature, *226*, 1211 (1970). Recent discovery of RNA-dependent DNA-polymerase enzyme in RNA tumor viruses of animal species has been confirmed also by other authors as it results for instance from the papers hereinbelow listed:

Green et al.: Mechanism of carcinogenesis by RNA tumor viruses. An RNA-dependent DNA-polymerase in murine sarcoma viruses, Proc. Nat. Acad. Sci., U.S.A., *67*, 385–393 (1970).

Spiegelman et al.: Characterization of the products of RNA direct DNA-polymerases in oncogenic RNA viruses, Nature, London, *227*, 563 (1970).

Hatanaka et al.: DNA-polymerase activity associated with RNA tumor viruses. Proc. Nat. Acad. Sci., U.S.A., *67*, 143 (1970).

Scolnick et al.: DNA synthesis by RNA containing tumor viruses. Proc. Nat. Acad. Sci., U.S.A., *67*, 1034 (1970).

RNA virus implication in some tumors has been supported also by other facts:

Reverse transcriptase has been found to be present in particles from human milk obtained from women with a familiar history of breast cancer and from imbred population (Scholn et al., Nature, *231*, 97, 1971).

Priori et al. (Nature New Biology, *232*, 16, 1971) isolated a virus named ESP-1 containing reverse transcriptase from cells from the pleural fluid of a child with lymphoma and have successfully grown it in tissue cultures.

The presence in human breast cancer of RNA homologous to mouse mammary tumor virus RNA has been demonstrated through molecular hybridation experiments by R. Axel et al. (Nature, *235*, 32, 1972).

The possibility of a human breast cancer virus was also supported by electron microscopy of human milk (N. H. Sarkar et al., Nature, *236*, 103 1972).

RNA-directed DNA-polymerase activity and virus like particles have been isolated also from human rhabdomyosarcoma cells (McAllister et al., Nature, New Biol., *235*, 3, 1972).

At present there are no very effective drugs for treating viral diseases since viruses and cells have common metabolic requirements and pathways. The most promising approach to viral chemotherapy clearly is the design of suitable chemicals which combine specifically with viral or virus transformed cells polymerases but not with host cell polymerases controlling the expression of genetic information of viruses. Specific inhibitors of the viral or virus transformed cells enzymes and, in particular, inhibitors of polymerases of RNA tumor viruses may have an important role in providing drugs for leukemia and other cancer therapy. The inhibiting activity of the invention compounds has been tested on RNA-dependent DNA-polymerase of murine sarcoma virus and DNA-dependent DNA-polymerase activity of purified enzymes. The inhibition was tested according to the methods described by C. Gurgo et al., Nature, New Biology, 220, 111, 1971. The effect of different concentrations of drugs on polymerase activity was determined by following $H^3$dTTP (tritiated thymine deoxyriboside triphosphate) incorporation into the insoluble fraction. A typical example of the experimental procedures is the following:

Isolation of virus and purification of viral polymerases

Virus was isolated and purified from murine sarcoma virus (Moloney isolate) transformed rat cells (78A1 cells) and murine sarcoma virus (Harvey isolate) transformed mouse cells (MEH cells) as previously described (Green et al., Proc. Nat. Acad. Sci., U.S.A., *67*, 385–393, 1970; Rokutanda et al., Nature, *227*, 1026–1028, 1970). The virion polymerase was purified 20–40 fold by incubation of purified virus with 0.5% NP-40 (nonidet P-40) in 0.1 M NaCl, 0.01 M Tris buffer (pH 7.6), 0.001 M EDTA for 5 minutes at room temperature and zonal centrifugation in 15–30% sucrose gradients in 10 mM. sodium phosphate buffer (pH 7.4), 2.5 mM. $MgCl_2$, 10 mM. dithiothreitol, and 5% glycerol for 24 hours at 38,000 r.p.m. in a Spinco SW41 rotor. The peak fractions of enzyme activity (13–17) of twenty-two factions collected, were pooled, and stored at minus 70° C. in 30% glycerol.

DNA polymerase assay

Enzyme incubation was performed for one hour at 37° C. in 100 μl. of reaction mixture containing 40 mM. Tris buffer (pH 8.0), 5 mM. dithiothreitol, 30 mM. NaCl, 2.5 mM. $MgCl_2$, 0.1 mM. dATP, dGTP, dCTP, and 10 μCi of $^3$H-dTTP (12–18 Ci/mmole) as described by Green et al., in Proc. Nat. Acad. Sci. U.S.A. *67*, 385–393, 1970. The reaction was terminated by the addition of 150 μl. of 1N perchloric acid. Calf thymus DNA (100 μg.) was added as carrier; the radioactive DNA product was processed as described in the two papers mentioned above. Endogenous RNA-dependent DNA-polymerase activity was measured after the addition of 0.01% NP-40 to purified virus at the time of assay. The DNA-polymerase activity of purified viral polymerase was measured with 2 μg. of poly d(A-T) as template and no-NP-40.

Test for inhibition by rifamycin derivatives

Rifamycin derivatives were dissolved in dimethylsulfoxide (DMSO) at a concentration of 5 mg./ml. and stored at 4° C. Inhibition of the endogenous RNA-dependent DNA-polymerase activity was tested by adding 2 μl. of derivative appropriately diluted in DMSO or 2 μl. of DMSO (control) to the assay mixture prior to addition to disrupted virus which contained 15 to 30 μg. of viral protein. Enzyme incubation was performed for 60 minutes at 37° C. Inhibition of purified enzyme was tested by pre-incubation of 2 μl. or derivative of DMSO with 30 μl. of enzyme (1 to 2 μg. of protein) for 10 minutes at 37° C.; then 70 μl. of substrate mixture was added and the mixture further incubated and processed as described above. In representative tests certain compounds of the present invention at a concentration of 2–100 μg./ml. or less reduced the incorporation of $H^3$-dTTP to less than 10% than found in the control tests clearly demonstrating inhibition of mechanism of carcinogenesis by RNA tumor viruses according to the most recent biochemical points of view. The inhibiting effect of reverse transcriptases has been confirmed also by tests on polymerase from murine leukemia virus. Murine leukemia virus RNA-dependent DNA-polymerase was prepared from Triton X100 disrupted virions as described by Gallo et al., in Nature, New Biology, *232*, 141, (1971). Virus of both Rauscher and Moloney types were previously purified by banding in the 1.16 g./ml. region of a sucrose density gradient after initial low speed centrifugation to remove cellular debris and cushioning on 60% sucrose through 20% sucrose. Final concentration of virus preparation was at $10^{11}$ particles/ml. As template endogenous 70S RNA was used. Concentration of 50 µg./ml. or less was found to be effective in inhibiting the enzyme. Similar results were found by using tumor cell polymerases of human origin. In this case the inhibiting activity was studied also on normal cell polymerases to characterize a selective effect. Representative rifamycin derivatives of formula I have been evaluated for their effects on two purified DNA-polymerases isolated from (1) human normal (PHA stimulated) blood lymphocytes, (2) a lymphoblast cell line (derived from a normal donor) and (3) human leukemic blood lymphoblast. Synthetic and/or native templates were used. A typical example of the experimental procedure is the following:

Human blood lymphoblasts

*Leukemic* lymphoblasts were isolated from the peripheral blood of patients with acute lymphocytic leukemia (ALL) by leukophoresis. The cells were washed and erythrocytes removed by hypotonic lysis. *Normal* lymphocytes were obtained from the peripheral blood from healthy donors after removal of granulocytes by nylon column chromatography. They were stimulated with phytohemagglutinin (PHA) for 72 hours as described before (Gallo et al., Nature, 228, 927, 1970; Gallo et al., Science, 165, 400, 1968) in order to maximize DNA-polymerase activity. However, because of the logistics problems in obtaining sufficient amounts of these cells, a human "normal" tissue culture cell line (1788) was used to supply less purified DNA-polymerases for some of the initial survey studies. Compounds of interest were then studied in more detail with the more purified enzymes from the normal and leukemic blood lymphocytes. These tissue culture cells were obtained from Associated Biomedic Systems, Inc.

DNA polymerase preparations

Cellular DNA polymerases were extracted and purified from normal blood (PHA stimulated) lymphocytes, and leukemic blood lymphocytes and (1788) lymphoid cells by homogenization in hypotonic buffer followed by Triton X100 and/or high salt extraction of the extra lysosomal pellet. After differential centrifugation cellular extracts were further purified by DEAE cellulose, phosphocellulose, and Sephadex G200 column chromatography.

DNA polymerase assays

DNA polymerase assays were carried out in a final volume of 100 µl. The assay mixture contained Tris-HCl buffer, pH 8.3, 50 mM.; MgAc 6.0 mM.; dithiothreitol, 8.0 mM.; NaCl, 6.0 mM. Adjustment of pH was carried out after addition of inhibitors which were previously dissolved in dimethyl sulfoxide (DMSO). The final concentration of DMSO was 0.5% and all control samples included this amount of DMSO. An enzyme concentration that catalyzes an incorporation of approximately 1.0 pmole/hr. was used in the assay. The enzyme was in most cases preincubated for 5 minutes with the inhibitor. The reaction was then initiated by the addition of template either synthetic DNA (poly d(AT) Miles Lab.) and DNA.RNA hybrid (oligo dT.poly rA), at 5 µg./ml. or native templates; activated salmon sperm DNA at 50 µg./ml., and endogenous 70S viral RNA; 10 µCi or ($^3$H-methyl)-TTP (New England Nuclear, 18.6 mCi/µmole, lyophilized and redissolved in 0.01 M HCl just prior to usage) and dATP ($8 \times 10^{-5}$ M, with synthetic template) or all three deoxynucleoside triphosphates ($8 \times 10^{-5}$ M with RNA or DNA templated reactions). In some experiments, there was no preincubation of enzyme with inhibitor. In these cases reactions were initiated by adding enzyme to the complete reaction mixture which included the inhibitor. Samples were withdrawn at the start of incubation and after 30 minutes and terminated by the addition of 2 ml. of 0.08 M sodium pyrophosphate, and precipitated in 12.5% cold trichloroacetic acid (TCA) with yeast RNA (400 µg.) as carrier. The products were collected on Millipore filter, washed extensively with 5% TCA and 1 ml. of DMSO-ethanol-0.1 M NaCl mixture (0.5:70:29.5), dried and counted in 2 ml. of $BBS_3$ (Beckman) and 10 ml. of liquifluor (New England Nuclear) in a Packard liquid scintillation counter. Concentrations varying from 5 to 20 µg./ml. were found to provoke a 50% inhibition of leukemic polymerase with a synthetic DNA template. Reaction templated by a synthetic RNA template (poly rA.rU) were even more susceptible. Representative experiments carried out with native template on normal and tumor cell polymerase showed a higher susceptibility of the tumor enzymes to the tested compounds.

Other biological characteristics displayed by the new substituted rifamycins include inhibition of focus formation on mouse, rat and human cells by the Moloney and Kirsten strain of murine sarcoma virus; selective inhibition of virus production by already transformed mouse and human cells; detection of revertant cells using the murine sarcoma virus transformed non-producer mouse and rat cell systems. The hydrazone compounds of the present invention have moreover confirmed their selective toxicity for virus transformed cells of mouse, rat and human origin when tested for colony forming ability. In studies to determine the effect of the compounds of inhibiting focus formation by Moloney sarcoma virus on BALB/3T3 tissue cultures the following procedure is employed:

BALB/3T3 cell culture is grown in 250 ml. plastic flasks in growth medium consisting of Eagle's minimal essential medium with 10% fetal bovine serum. Cell counts are made with a Coulter counter after suspending the cells with trypsin-EDTA and diluting in growth medium. Moloney murine sarcoma virus, as a tumor homogenate is employed. It is passaged four times in a Swiss-derived high passage mouse embryo cell line and assayed for focus-forming units in BALB/3T3 cells. In conducting the studies, a modification of the method described by Hartley and Rowe, Proc. Nat. Acad. Sci., 55, 780 (1966) is used. In the present work, flasks are seeded with from $1-2 \times 10^6$ cells in 25 ml. of growth medium and incubated at 37° C. for 24 hours. Following the removal of fluids, virus at a predetermined number of focus forming units is introduced into 0.5 ml. of growth medium and allowed to adsorb on the monolayer of cells for 90 minutes at 37° C. Following this adsorption period, a predetermined quantity, usually as a dose rate of from about 5 to 10 µg./ml. of an imidazole rifamycin compound (previously dissolved in dimethylsulfoxide at a concentration of 1 mg./ml.) and carried in 25 ml. of growth medium, is added and the cultures returned to the incubator. As a control, dimethylsulfoxide alone in the growth medium is added to a separate culture. After three days inoculation the cultures are fluid-changed and foci of transformed cells counted at day seven.

In this same method, vesicular stomatitis virus, New Jersey serotype is studied. Methods used to grow and assay this virus have been described by Hackett et al., Virology, 31, 114 (1967).

These properties indicate that these compounds possess an effective inhibitory activity on virus induced tumors in animals.

We claim:

1. A 3-substituted rifamycin SV compound of the formula

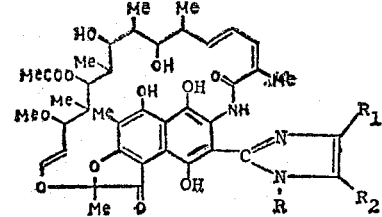

wherein R represents hydrogen, lower alkyl, phenyl or phenyl lower alkyl, $R_1$ and $R_2$ together represent a carbocyclic chain forming with the double bond of the adjacent imidazole moiety a benzene ring, a mono or polysubstituted benzene ring wherein the substituents are independently selected from lower alkyl, lower alkoxy, halo, carboxy, carbalkoxy, sulfo, sulfamoyl, nitro, trifluoromethyl, carbamyl, mono and di-lower alkyl-carbamyl, and methylenedioxy or a hydro-, oxo-, hydroxy- or sulfo-substituted or unsubstituted fused polynuclear aromatic radical of the group consisting of naphthalene, acenaphthene, fluorene, anthracene and phenanthrene; and the corresponding 25-desacetyl and 16, 17; 18, 19; and 28, 29-hexahydro derivatives thereof.

2. The compound of Claim 1 which is 3-(2-benzimidazolyl)-rifamycin SV.

3. The compound of Claim 1 which is 25-desacetyl-3-(2-benzimidazolyl)-rifamycin SV.

4. The compound of Claim 1 which is 3-(5-methyl-2-benzimidazolyl)-rifamycin SV.

5. The compound of Claim 1 which is 3-(5,6-dimethyl-2-benzimidazolyl)-rifamycin SV.

6. The compound of Claim 1 which is 3-(4,5-dihydro-7H-acenaphth[4,5-d]imidazol-8-yl)-rifamycin SV.

7. The compound of Claim 1 which is 3-(5-chloro-2-benzimidazolyl)-rifamycin SV.

8. The compound of Claim 1 which is 3-(1,9-dihydrofluoreno[2,3-d]imidazol-2-yl)-rifamycin SV.

9. The compound of Claim 1 which is 3-(6,11-dioxoanthra[1,2-d]imidazol-2-yl)-rifamycin SV.

10. The compound of Claim 1 which is 3-(1H-9-oxofluoreno[2,3-d]imidazol-2-yl)-rifamycin SV.

11. The compound of Claim 1 which is 3-(5-carboxy-2-benzimidazolyl)-rifamycin SV.

12. A process for preparing a 3-imidazole substituted rifamycin of the formula

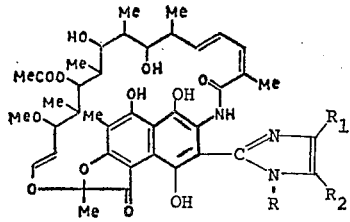

wherein R represents hydrogen, lower alkyl, phenyl or phenyl-lower alkyl, $R_1$ and $R_2$ together represent a carbocyclic chain forming with the double bond of the adjacent imidazole moiety a benzene ring, a mono or poly-substituted benzene ring wherein the substituents are independently selected from lower alkyl, lower alkoxy, halo, carboxy, carbalkoxy, sulfo, sulfamoyl, nitro, trifluoromethyl, carbamyl, mono and di-lower alkyl-carbamyl, and methylenedioxy, or a hydro-, oxo-, hydroxy- or sulfo- substituted or unsubstituted fused polynuclear aromatic radical of the group consisting of naphthalene, acenaphthene, fluoroene, anthracene and phenanthrene; and its 25-desacetyl and 16, 17; 18, 19; and 28, 29-hexahydro derivatives; which comprises condensing substantially equimolar amounts of (1) 3-formyl-rifamycin or its corresponding 25-desacetyl or 16, 17; 18, 19; and 28, 29-hexahydro derivative with (2) an ortho diamine of the formula

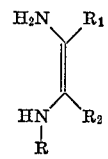

wherein R, $R_1$ and $R_2$ have the same meaning as in Claim 1 in the presence of tetrahydrofuran, dioxane or a lower alkanol at substantially room temperature up to substantially reflux temperature to form a Schiff base and by product water of condensation until condensation is substantially complete and oxidizing the resulting Schiff base with a hydrogen acceptor selected from the group consisting of air, cupric salts, mercuric oxide, manganese dioxide, isoamyl nitrite, potassium ferrcyanide and lead tetraacetate in the presence of a mixture of acetic acid and a chlorinated lower hydrocarbon as reaction medium at a temperature between about minus 5° and 10° C. for a time sufficient to form the said 3-imidazole substituted rifamycin and removering said 3-imidazole compound as product.

13. A process as defined in Claim 12 and including the step of washing the 3-imidazole substituted rifamycin SV product with aqueous 10% ascorbic acid if necessary, thereby converting any quinonic form of said product to the corresponding hydroquinone.

No references cited.

HENRY R. JILES, Primary Examiner

R. T. BOND, Assistant Examiner

U.S. Cl. X.R.

424—244, 273